Sept. 19, 1961   R. B. RANSOM   3,000,239
DEPTH STOP FOR A BORING TOOL
Filed Oct. 29, 1959
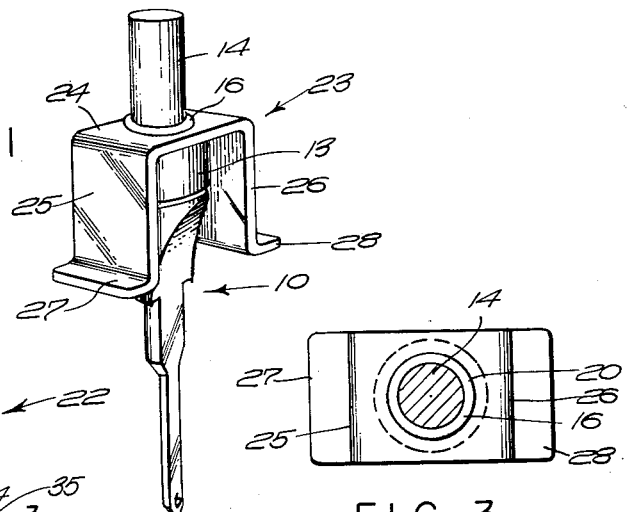
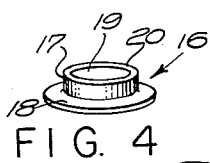
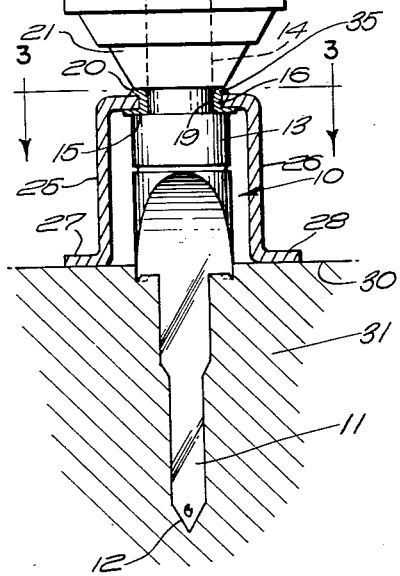
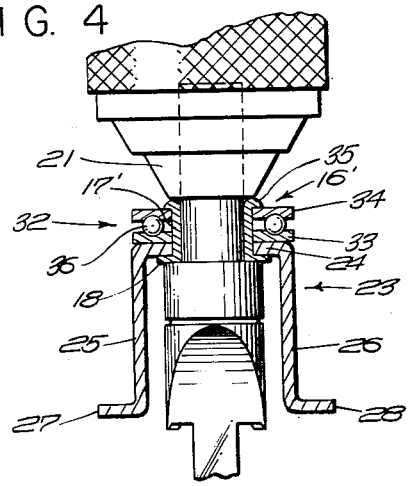
INVENTOR.
ROBERT B. RANSOM
BY
*Barlow & Barlow*
ATTORNEYS

United States Patent Office 3,000,239
Patented Sept. 19, 1961

3,000,239
DEPTH STOP FOR A BORING TOOL
Robert B. Ransom, Westerly, R.I., assignor to Norfolk Products Corporation, a corporation of Connecticut
Filed Oct. 29, 1959, Ser. No. 849,475
8 Claims. (Cl. 77—55)

This invention relates to a depth stop for a boring tool.

Heretofore it has been usual for depth stops to be fixed with relation to the boring tool, and when the boring tool was inserted to an extent so that the depth stop engaged the surface of the material in which the hole was being made, the depth stop would rotate with the tool causing a mark to be made on the surface of the material about the hole. In many cases this was objectionable.

One of the objects of this invention is to provide an extremely simple device which will function to limit the depth of the boring tool but still will not mar the surface of the material in which the hole is being made.

Another object of this invention is to provide a depth stop which will stop rotating when it engages the surface of the material in which the hole is being bored so that there will be no marking of the surface about the hole.

Another object of this invention is to provide a complete unit which may be assembled on or removed from a boring tool at will before the boring tool is placed in a chuck for rotating the same.

With these and other objects in view, the invention consists of certain novel features of construction as will be more fully described and particularly pointed out in the appended claims.

In the accompanying drawings:

FIGURE 1 is a perspective view of a boring tool with my depth stop assembled thereon;

FIGURE 2 is a sectional view showing the boring tool as embraced in a fragmental portion of a chuck and in engagement with the surface of the material into which the boring tool penetrates;

FIGURE 3 is a section on line 3—3 of FIGURE 2;

FIGURE 4 is a perspective view of the collar of the assembly;

FIGURE 5 is a slightly modified sectional view showing an anti-friction bearing in the assembly.

In proceeding with this invention, I provided a collar which will engage a shoulder of the boring tool and extend along the shank of the boring tool and on this collar between the end which engages the abutment of the boring tool and its other end which may engage the chuck jaws, I have mounted a depth stop which embraces the collar and is of a thickness less than the dimension between the ends of the part of the collar which receives it so as to be freely rotatable on the collar. This depth stop may be of various constructions but a pair of legs extending generally parallel to the axis of the boring tool to the required length for limiting the depth is a simple and effective form for the operation of this invention.

With reference to the drawings 10 designates generally a boring tool having a bit 11 and penetrating end 12. The body part of the tool 13 is reduced to provide a shank 14 and providing a shoulder 15. A collar designated generally 16 (FIG. 4) comprises a cylindrical portion 17 having a flange extending outwardly at 18. The collar has an internal circular opening of a size to fit over the shank 14 so that its flange 18 will engage the shoulder 15. The other end 20 of the collar is adapted to be engaged by the chuck jaws 21 of the chuck designated generally 22 and limit the insertion of the tool shank 14 into the chuck.

Upon the cylindrical portion 17 of the collar 16, I have mounted a depth stop 23 comprising a bridge portion 24 with legs 25 and 26 extending downwardly from the bridge portion 24 to an extent depending upon the amount of depth which it is desired to define in the drilled stock and at the free ends of the legs 25 and 26 the stock of the material is turned outwardly away from the axis of the collar and the boring tool 10 to provide feet 27 and 28 and thus provide a broader surface for engagement with the surface 30 of the stock 31 into which the drill is being inserted. The thickness of the bridge portion 24 between these legs is of a dimension less than the dimension between the upper surface of the flange 18 and the end 20 of the cylindrical portion 17 of the collar so that even with the shank 14 inserted into the collar its fullest extent with the chuck engaging the end 20 and the surface of the flange engaging the shoulder 15, the member 23 is freely rotatable about the collar.

In order to hold the depth stop 23 and the collar assembled as a unit the upper end of the collar is rolled outwardly as shown at 35 to extend over the surface of the bridge but not in binding relation therewith so the two parts will be held together and may be placed together on the shank 14 of the drill. If desired, a recess may be provided in bridge 24 to receive the rolled end.

In operation as the drill is rotating and moving inwardly to form a hole in the work 31, all of the parts including the depth stop 23 will be rotating with the boring tool, and any chips about the hole on surface 30 will be swept out of the way by the legs and feet 25, 27 and 26, 28 of the depth stop 23 so that none will be beneath the depth stop when it engages the surface 30. When either or both of the feet 27 and 28 of the depth stop member 23 engage the surface 30, this depth stop 23 will stop rotating and such parts as continue rotation will be the chuck the collar and the boring tool while the depth stop 23 has stopped rotating and thus will not mar the surface 30 adjacent to the hole being made.

In the showing in FIGURE 5 the collar is shown at 16' and is provided with a longer cylindrical neck portion 17'. Encircling this collar there is a ball bearing designated generally 32 which, as conventionally shown, has one plate 33 engaging the bridge portion 24 of the depth stop and the other plate 34 held retained on the collar by the outward rolled portion 35, while there are balls represented at 36 between the two plates. Thus, there is an anti-friction bearing provided between the depth stop 23 and the chuck jaws 21 so that the depth stop 23 may stop while the jaws may freely rotate as contact is had with the work.

I claim:

1. A depth stop for a boring tool comprising a circular spacing collar, one end of which is to engage a shoulder of the boring tool and the other end of which is to engage the chuck jaws which grip the boring tool, and a depth control member freely embracing said collar between its engaged ends and of a dimension less than the distance between its engaged ends whereby said member is freely rotatable on said collar.

2. A depth stop as in claim 1 wherein means are provided to hold the collar and member assembled but freely relatively rotatable.

3. A depth stop as in claim 1 wherein an anti-friction bearing is interposed between said depth control member and said collar.

4. A depth stop as in claim 1 wherein means are provided to hold the collar and member assembled but freely relatively rotatable comprising spun over portions on said collar overhanging a portion of the depth control member.

5. A depth stop as in claim 1 wherein said member comprises a bridge embracing said collar and a pair of legs extending from said bridge away from the end of the collar which engages the chuck jaws.

6. A depth stop as in claim 1 wherein said member comprises a bridge embracing said collar and a pair of legs extending from said bridge away from the end of the collar which engages the chuck jaws, said legs being provided with right angular extending feet at their free ends.

7. A depth stop as in claim 1 wherein said member comprises a bridge embracing said collar and a pair of legs extending from said bridge away from the end of the collar which engages the chuck jaws, said legs being provided with right angular extending feet at their free ends extending outwardly away from the axis of the collar.

8. In combination a boring tool having a shank extending upwardly from a shoulder, a chuck gripping said shank at a location spaced from said shoulder, and a depth control member having a portion with a hole therethrough of a size larger than said shank through which hole said shank extends, said portion being of a dimension less than the distance between said shoulder and chuck whereby said control member is freely rotatable on said shank and may stop rotating while said tool and chuck rotate.

References Cited in the file of this patent

FOREIGN PATENTS 807,154    Germany _____ June 25, 1951